March 24, 1953     J. J. SLOMER     2,632,458
BY-PASS VALVE
Filed April 12, 1946
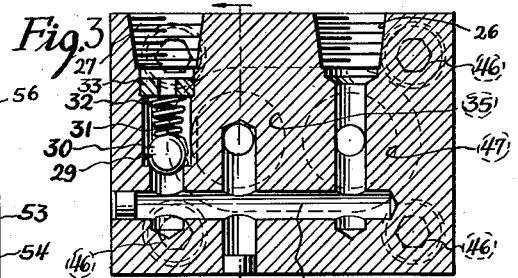
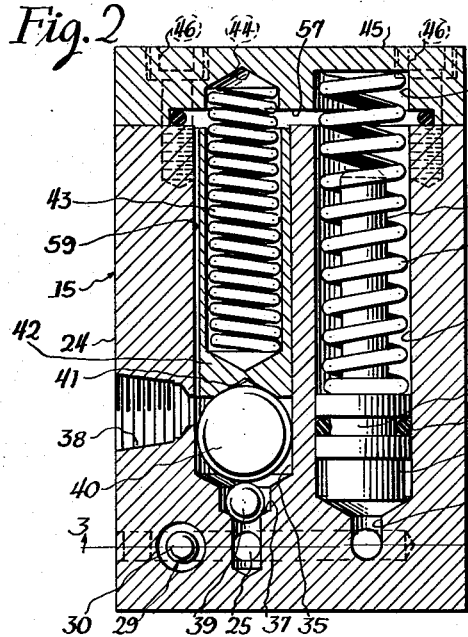
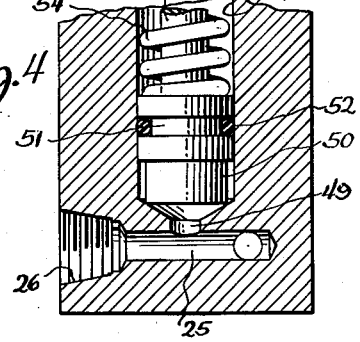
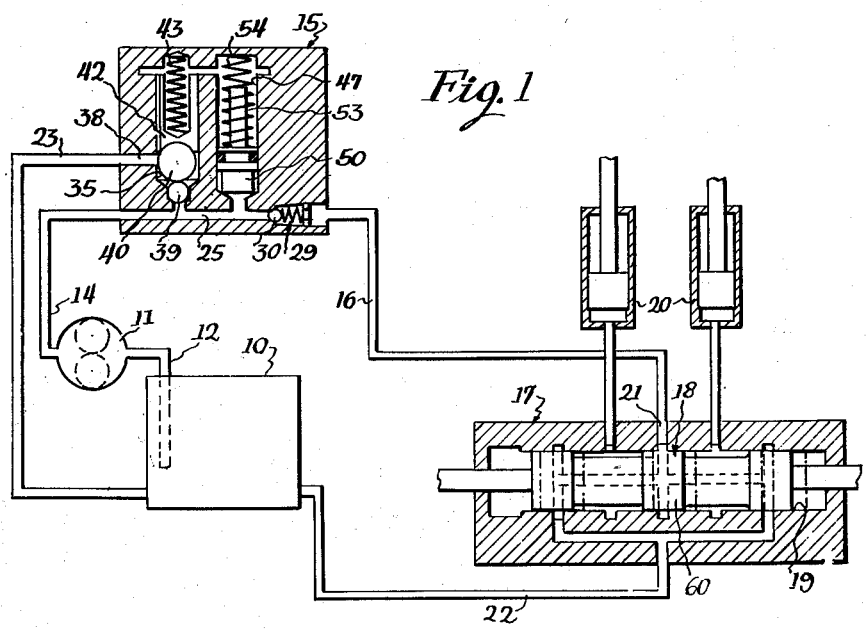
INVENTOR
Joseph J. Slomer
Clarence F. Poole
ATTORNEY Patented Mar. 24, 1953

2,632,458

UNITED STATES PATENT OFFICE 2,632,458

BY-PASS VALVE

Joseph J. Slomer, Chicago, Ill., assignor to Goodman Manufacturing Company, Chicago, Ill., a corporation of Illinois Application April 12, 1946, Serial No. 661,714

3 Claims. (Cl. 137—108)

1

This invention relates to improvements in by-pass valves and more particularly relates to an improved form of by-pass valve adapted to unload a pressure line.

By-pass valves have heretofore been provided for unloading a pressure line and fluid pump upon overload thereof. Where such valves have been connected in the pressure line between the pump and a rotary or sleeve valve for supplying fluid under pressure to the actuating parts of a fluid pressure system, the by-pass valve has opened to by-pass fluid under pressure every time the rotary or sleeve valve moves to a dead or blind spot during its movement from one operating position to another, which momentarily blocks the pressure line until this dead spot is passed by. This results in a dumping of the fluid from the pressure line back to the fluid storage tank each time the operating valve passes by a dead spot in the valve piston, with a resultant loss in operating pressure and decrease in efficiency in the hydraulic system.

My invention has as its principal object to remedy these deficiencies in by-pass valves by providing a by-pass valve having an expansion chamber connected in the pressure line, which is adapted to absorb the pump output during the time required for the valve to pass over a blocked position and thus take momentary surges in pressure in the pressure line, so as to prevent the dropping of pressure in the pressure line upon normal operation of the control valves in a fluid pressure system.

This and other objects of my invention will appear from time to time as the following specification proceeds and with reference to the accompanying drawings wherein:

Figure 1 is a fluid diagram of a hydraulic system diagrammatically illustrating a by-pass valve constructed in accordance with my invention connected in a pressure line leading from a fluid pump to a fluid control valve, which is provided to control operation of the actuating parts of the hydraulic system;

Figure 2 is an enlarged detail sectional view of the valve shown in Figure 1;

Figure 3 is a sectional view taken substantially along line 3—3 of Figure 2; and Figure 4 is a fragmentary sectional view taken substantially along line 4—4 of Figure 3.

In Figure 1 of the drawings a fluid pressure system is shown as including a fluid storage tank 10 for supplying fluid to a pump 11 through a pipe 12. A pressure line 14 connects said pump with a by-pass valve 15 constructed in accord-

2 ance with my invention. A pressure line 16 connects said by-pass valve with a control valve 17. Said valve is herein shown as being a well known form of piston valve having a piston 18 movable in a valve chamber 19 for controlling the admission and release of fluid under pressure to and from two fluid motors 20, 20, and for holding pressure therein. A port 21 connects said pressure line 16 with said valve chamber at a point intermediate its ends. A return line 22 connects said pressure control valve 17 with the tank 10, while a by-pass line 23 connects said by-pass valve 15 with said tank, for dumping fluid from said pump to said tank upon overload of the pressure line 16.

The by-pass valve 15 includes a valve block 24 having a pressure passageway 25 therein and passing therethrough. A threaded intake opening 26 is provided to permit the pressure line 14 to be connected with said valve block. A similar outlet opening 27 communicating with the outlet end of said pressure passageway is also provided and is adapted to have the pressure line 16 connected thereto. A check valve 29 is provided in said pressure passageway, adjacent said outlet opening, to hold pressure in said pressure line 16 upon the by-passing of pressure from the pressure line 14 through the by-pass line 23. Said check valve is herein shown as being a well known form of ball type check valve including a ball 30 seated in a shouldered portion 31 of the pressure line 16 by a spring 32, which is interposed between said ball and a fitting 33 suitably mounted in said pressure line, adjacent the outlet opening 27.

A valve chamber 35 is formed in the valve block 24. Said valve chamber has a reduced shouldered passageway 37 at one of its ends, which is connected with the pressure passageway 25. A by-pass outlet 38 leads from said valve chamber to the outside of said valve and is adapted to have the by-pass line 23 connected thereto, to by-pass pressure from the pressure line 25 upon overload of said pressure line.

The valve means for holding pressure in the pressure line 25, except upon predetermined overload conditions thereof, includes a ball 39 seated in the shouldered portion of the shouldered passageway 37 and forming a relief or by-pass valve. The ball 39 is abutted by a ball 40 of a larger diameter than the ball 39 and fitting within and slidably movable along the valve chamber 35, and closing the by-pass outlet 38 but permitting fluid leaking by said ball to drain back into the tank 10. The ball 40 is abutted by a recessed substantially conical end portion 41 of a piston 42, which is slidably movable within said valve chamber and forms a seat for a spring 43. The recessed conical end of said piston is so formed that its sides are substantially tangential to the surface of the ball 40 so as to permit a slight amount of rolling movement of said ball within said chamber. Said piston is herein shown as being drilled from its end opposite from said recessed portion for a greater portion of its length, to receive the spring 43 and form a seat therefor. The end of said spring opposite from said ball is seated in a recessed portion 44 of a cover 45 for said valve block. Said cover may be secured to said valve block by machine screws 46, 46. Suitable packing such as an O-packing ring may be provided between said valve block and cover to prevent the leakage of fluid thereby.

An expansion chamber 47 is herein shown as being formed in the valve block 24, parallel to the valve chamber 35, to absorb the pump output during the time required for the valve piston 18 to pass over a blocked position. Said expansion chamber communicates at its lower end with the pressure passageway 25 through a fluid passageway 49, of a smaller diameter than said expansion chamber. A piston 50 is movable along said expansion chamber and its lower end is adapted to close the lower end of said expansion chamber, to prevent fluid from entering said expansion chamber from said pressure line 25, except upon predetermined pressures in said pressure line. Said piston has a grooved portion 51 having an O-packing ring 52 mounted therein, to prevent the leakage of fluid thereby. Said piston also has a stem 53 extending therefrom along said expansion chamber for a portion of its length. A spring 54 encircles said stem and abuts said piston at one of its ends. The opposite end of said spring is seated in a recessed portion 56 of the top cover 45. A passageway 57 connects the upper end of said expansion chamber with the valve chamber 35, to permit fluid leaking past said piston to be returned to the tank 10 through the by-pass outlet 38 to the by-pass line 23, along a passageway 59 formed along one side of the piston 42, by flattening one side thereof.

The spring 54 is considerably lighter than the spring 43 holding the ball 39 on its seat. Said piston 50 will thus move along the expansion chamber 47, to permit said expansion chamber to absorb the pump output and take care of momentary pressure surges before opening of the by-pass or relief valve formed by the balls 39 and 40.

It may now be seen that during operation of the pressure control valve 17 to supply fluid under pressure to either of the fluid motors when a central land 60 of the piston 18 of said control valve blocks the port 21 as it moves past said port, from a position to admit fluid to or release fluid from one of said motors to a position to admit fluid to or release fluid from the other of said motors, the momentary blocking of said pressure line during this movement of said piston will cause the piston 50 to move along the expansion chamber 47, and said expansion chamber will take the pump output during the time required for the valve to pass over the blocked position and full pressure will be maintained in said pressure passageway during this period.

When, however, the valve piston 18 is in the position shown in Figure 1, and is holding fluid in the motors 20, 20, and the passageway from the pressure line 16 to the chamber of said valve is blocked by the land 60, or when the valve piston is moved so slowly that the expansion chamber 47 is no longer capable of absorbing the capacity of the pump 11, the ball 39 will be unseated by pressure in the pressure line 25 and pressure will be exerted on the ball 40 to move said ball upwardly against the spring 43 past the by-pass outlet 38 so as to dump fluid from said pump to the tank 10 through the pipe 23, while said pump continues to run until normal operating conditions are restored.

While I have herein shown and described one form in which my invention may be embodied, it will be understood that the construction thereof and the arrangement of the various parts may be altered without departing from the spirit and scope thereof. Furthermore, I do not wish to be construed as limiting my invention to the specific embodiment illustrated, excepting as it may be limited in the appended claims.

I claim as my invention:

1. A by-pass valve including a valve block, a pressure passageway in said valve block, a valve chamber in said block communicating with said pressure passageway, a by-pass passageway leading from said pressure passageway through said valve chamber to an outlet to divert fluid from said pressure passageway at times, said valve chamber having a seat, a valve including a first ball engageable with said seat, and a second ball arranged in backing relation with said first ball, both of said balls being guided for movement toward and away from said seat, and a spring urging said balls toward said seat, whereby upon pressure overload conditions existing in said pressure passageway the balls will be displaced against the urgence of said spring to divert fluid from said pressure passageway through said by-pass passageway and said balls maintaining said by-pass passageway open in all operative positions thereof.

2. In a by-pass valve including a valve block, a pressure passageway leading through said block, two chambers in said valve block communicating with said pressure passageway, a check valve in said valve block at the delivery side of said pressure passageway, one of said chambers having a piston movable therein and being a surge chamber, the other of said chambers having a relief valve therein and having a by-pass passageway leading therefrom and controlling the relief of fluid to said by-pass passageway, a spring opposing movement of said piston along said surge chamber, another spring urging said relief valve into a closed position, said springs being of unequal strength to increase the volume of said surge chamber prior to opening of said relief valve, a leakage passageway between said chambers, and said relief valve maintaining said by-pass passage open to return fluid leaking by said relief valve and piston, regardless of the operative position of said relief valve.

3. A by-pass valve including a valve block, a pressure passageway leading through said valve block, a valve chamber in said block communicating with said pressure passageway at one of its ends, a by-pass passageway leading from said valve chamber, said valve chamber having a seat at the end theerof adjacent said pressure passageway, and valve means cooperating with said seat including a first ball engageable with said seat, a second ball of substantially the diameter of said chamber arranged in backing relation with respect to said first ball, spring means acting against said second ball and urging said first ball toward said seat, a leakage passageway leading into said chamber from the end thereof opposite said pressure passageway, said second ball serving purely as a reaction member between said spring means and first ball and maintaining said by-pass passageway open to by-pass fluid leaking into said chamber, regardless of the operative position of said balls.

JOSEPH J. SLOMER.

REFERENCES CITED

The following references are of record in the file of this patent:

UNITED STATES PATENTS

| Number | Name | Date |
|---|---|---|
| 418,335 | Jewell | Dec. 31, 1889 |
| 929,852 | Hosford | Aug. 3, 1909 |
| 941,587 | Putnam | Nov. 30, 1909 |
| 994,544 | Sutter | June 6, 1911 |
| 1,776,937 | Timbs | Sept. 30, 1930 |
| 1,846,483 | Gilbert | Feb. 23, 1932 |
| 1,871,043 | Chalmers | Aug. 9, 1932 |
| 1,974,296 | Ball | Sept. 18, 1934 |
| 1,983,051 | Smith | Dec. 4, 1934 |
| 2,044,629 | Parker | June 16, 1936 |
| 2,162,898 | Rotter | June 20, 1939 |
| 2,210,144 | Day | Aug. 6, 1940 |
| 2,264,375 | Hill | Dec. 2, 1941 |
| 2,395,671 | Kleinhans | Feb. 26, 1946 |
| 2,507,384 | Schneck | May 9, 1950 |
| 2,517,406 | Mott | Aug. 1, 1950 |